United States Patent [19]

Dureigne et al.

[11] Patent Number: 4,511,992
[45] Date of Patent: Apr. 16, 1985

[54] SYSTEM FOR RECONSTITUTING, BY FILTERING, AN ANALOG SIGNAL FROM A PSEUDO-ANALOG SIGNAL

[75] Inventors: Bernard Dureigne; Stéphane Guerillot, both of Paris; Alain Regnault, Chevilly Larue, all of France

[73] Assignee: Organisme Autonome Dote de la Personnalite Civile Agence France Presse, France

[21] Appl. No.: 375,765

[22] Filed: May 6, 1982

[30] Foreign Application Priority Data

May 8, 1981 [FR] France .................. 81 09239

[51] Int. Cl.³ ............................................. H03H 7/00
[52] U.S. Cl. ..................................... 364/825; 328/167
[58] Field of Search .............. 364/572, 724, 825, 600, 364/602, 605; 328/167; 340/347 DA, 347 NT; 333/174

[56] References Cited

U.S. PATENT DOCUMENTS

| | | | |
|---|---|---|---|
| 3,646,549 | 2/1972 | Bryden | 340/347 DA |
| 3,678,416 | 7/1972 | Burwen | 328/167 X |
| 3,706,045 | 12/1972 | Salvert | 328/165 |
| 3,742,395 | 6/1973 | Yoneyama | 333/174 X |
| 3,753,159 | 8/1973 | Burwen | 328/167 X |
| 3,754,236 | 8/1973 | Dotson | 340/347 DA |
| 3,889,108 | 6/1975 | Cantrell | 333/174 X |
| 4,038,539 | 7/1977 | Van Cleave | 328/167 X |
| 4,275,453 | 6/1981 | Wagner | 364/825 |

Primary Examiner—Jerry Smith
Assistant Examiner—Allen MacDonald
Attorney, Agent, or Firm—Scully, Scott, Murphy and Presser

[57] ABSTRACT

Method for the reconstitution, by filtering, of an analog signal, from a pseudo-analog signal obtained by a double, analog to digital, digital to analog conversions of the analog signal, with processing of the digital signal. In greater detail, the pseudo-analog signal, obtained by double analog to digital, digital to analog conversion of an analog signal, is applied to an active filter the impedance of which is controlled by the absolute derivative of the positive value of the pseudo-analog signal. The derivative is obtained by a circuit comprising an RC filter receiving the pseudo-analog signal and a memory controlling the value of the impedance of the filter. The invention has particular application to the restitution of graphic or iconographic documents which have been previously digitally encoded.

6 Claims, 8 Drawing Figures

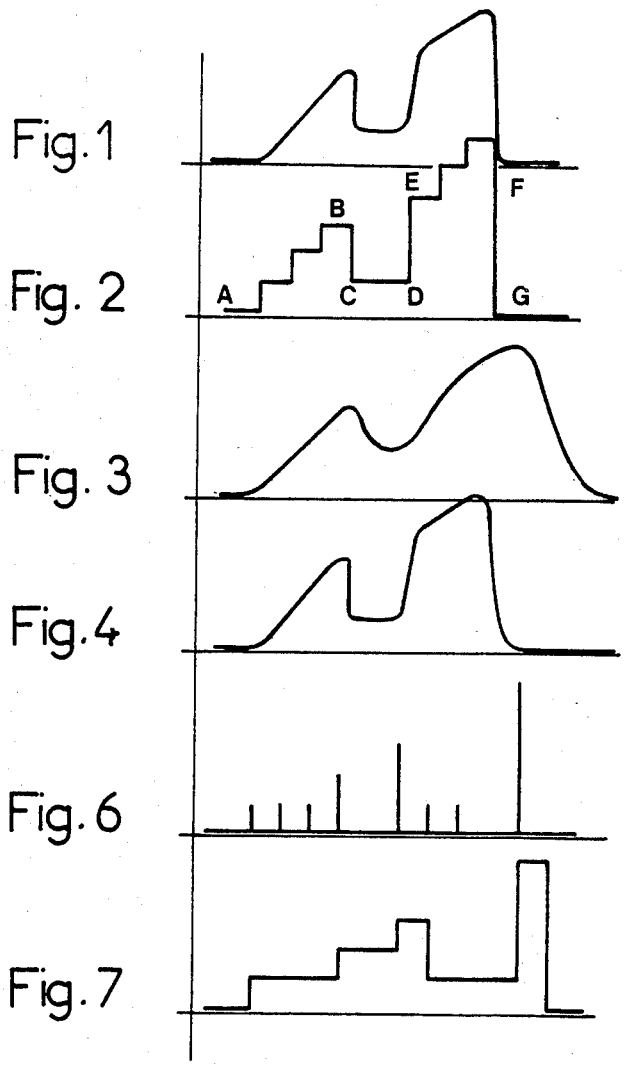
Fig. 1
Fig. 2
Fig. 3
Fig. 4
Fig. 6
Fig. 7
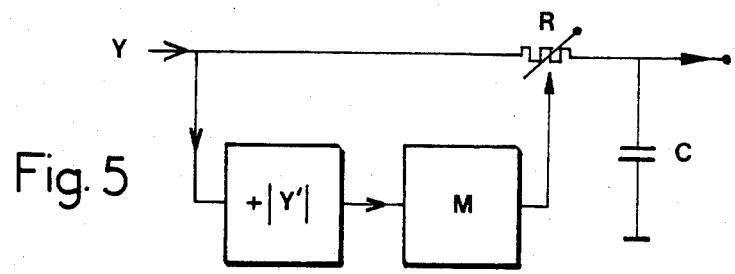
Fig. 5

SYSTEM FOR RECONSTITUTING, BY FILTERING, AN ANALOG SIGNAL FROM A PSEUDO-ANALOG SIGNAL

BACKGROUND OF THE INVENTION

The present invention relates to a method and circuit for the reconstitution, by filtering, of an analog signal, from a pseudo-analog signal obtained by a double analog to digital, digital to analog conversion of the analog signal along with processing of the digital signal.

In greater particularity, the subject invention relates to the filtering of a pseudo-analog signal in which the analog variation of amplitude as a function of time are represented by incremental level variations.

This problem of filtering is very important in relation to the restitution of graphic or iconographic documents which have been previously digitally encoded.

In the digital transmission of photographs or documents requiring the presence of half-tones, every shade of grey in black and white (or of luminence in color) is represented by a level. If a faithful restitution of the document is desired, it is necessary to increase the number of points (pixels) to be quantified, and to provide a large number of levels from black to white; two hundred and fifty-six, for example. In this case, a low-pass filter with a relatively short time constant will suffice to filter the signal such that it is identical to the original signal.

This solution, even if various compression codes are used, has the drawback of requiring a large number of binary data. In the case of an A4/2 format, for example, taking 4 points per mm, there would be 504,000 pixels and 4,032,000 binary bits.

This large quantity of binary bits makes it necessary either to use high speed transmission lines in order to transmit a document quickly, or to use complex compression codes to reduce the number of binary bits to be transmitted to a lower number. This technique calls for complex and expensive equipment for both the encoding and decoding functions.

Other solutions consist in the digital addition of an electronic noise signal to the signal, thereby making it possible to linearize the decoded signal and make the transitions less abrupt. This solution, likewise, is complex and expensive, and does not provide a really satisfactory quality restitution.

SUMMARY OF THE INVENTION

It is an object of the present invention to eliminate all of these drawbacks, and proposes, with this in mind, a method that quantifies an analog signal in a reasonable number of levels (16 to 32, for example), and then filters the pseudo-analog signal obtained after digital to analog decoding, by means of an active filter with a variable time constant which does not change the nature of the signal, and allows, in particular, filtering to a high degree of low variations in levels, and filtering to a low degree of high variations in levels.

According to one characteristic of the present invention, the pseudo-analog signal is filtered by a filter having a time constant inversely proportional to the derivative of the signal. In this case, the method according to the present invention also comprises the storage of the impedance of the filter between two successive derivatives.

The invention also relates to a circuit for implementing the method as described above, in which the pseudo-analog signal is applied to the input of a filter, for example of an RC type, the impedance of which, for example the value of R, is controlled by the absolute derivative of the positive value of the pseudo-analog signal by means of a circuit comprising, in series, a filter (hybrid ring junction) receiving the pseudo-analog signal and a memory controlling the value of the impedance of the filter.

BRIEF DESCRIPTION OF THE DRAWINGS

The invention is described below in greater particularity with respect to one exemplary embodiment of the present invention given by way of non-limiting example, with reference to the attached drawings in which:

FIG. 1 illustrates an analog signal having digital processing.

FIG. 2 represents a pseudo-analog signal obtained by digitizing and decoding of the signal shown in FIG. 1.

FIG. 3 illustrates a signal which would be obtained by filtering, with a low-pass filter, the signal shown in FIG. 2.

FIG. 4 represents the signal obtained by the process and circuit of the present invention.

FIG. 5 a theoretical block diagram illustrating the principles of the method and circuit according to the subject invention.

FIG. 6 represents the signal obtained by taking the derivative of the signal shown in FIG. 2.

FIG. 7 illustrates the signal obtained by storage of the signal of derivatives shown in FIG. 6.

DETAILED DESCRIPTION OF THE DRAWINGS

Figure 8:
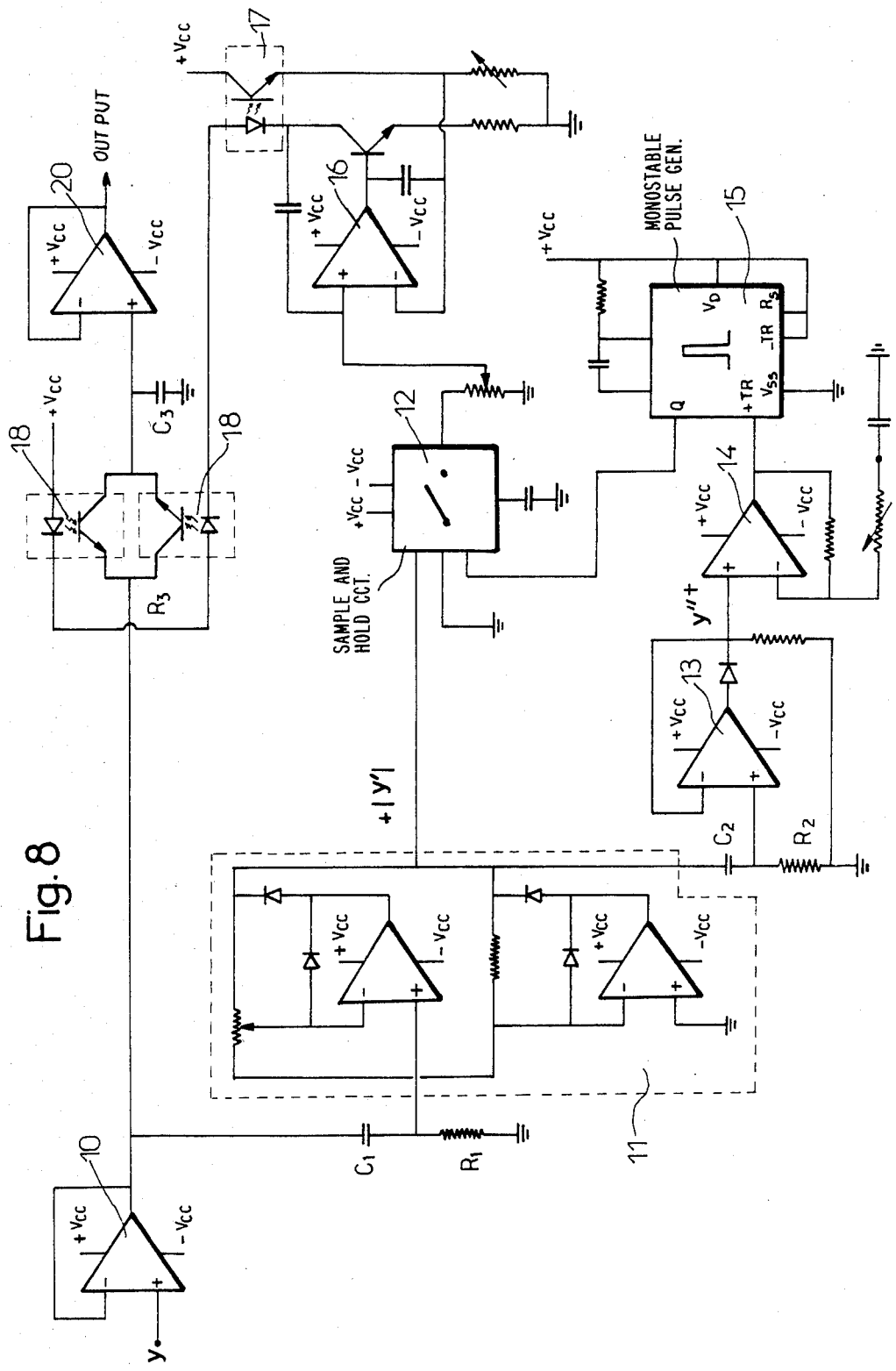
FIG. 8 is a schematic of a circuit according to the present invention.

Referring to FIGS. 1 and 2, it is noted that the variations in amplitude of an analog signal as a function of the time, are represented, after digital conversion (FIG. 2) by incremental level variations, with each level having a fixed value.

If the digitized (pseudo-analog) signal (FIG. 2) is filtered with a low-pass filter, then the signal shown in FIG. 3 is obtained, which, as is apparent, is not the same as the signal in FIG. 1 which should have been obtained by reconstitution.

In order to eliminate this drawback, i.e., to obtain a signal (Fig. 4) which is substantially identical to that in FIG. 1, the subject invention proposes to use a filter of the type represented by the block diagram in FIG. 5.

Pursuant to this filter (FIG. 5) the pseudo-analog signal Y is applied to the input of an RC filter, and the value of R is controlled by the absolute derivative of the positive value Y' of signal Y (derivative+Y').

Between successive derivatives, this value is stored in memory M. In the case of the signal AB in FIG. 2, the three derivatives corresponding to the three steps, are of equal amplitude, since the levels of transition are identical. The derivatives corresponding to levels BC, DE and FG are of greater value, as well as the respective levels of transition (FIG. 6). This signal which is then stored in memory M (FIG. 5) is shown in FIG. 7. For the low variations in levels, the variable resistor R (FIG. 5) has a high resistance, since it is controlled by a low voltage (FIG. 7). The RC product is therefore high which produces more or higher filtering. For the high variations in levels, resistor R (FIG. 5) is low, since it is controlled by a high voltage (FIG. 7), and the RC product is therefore lower which produces less effective filtering. As a matter of fact, resistor R (FIG. 5) functions as a controlled generator of absolute constant current.

It is therefore apparent that the circuit described above allows filtering of low variations in levels (part AB in FIG. 2) to a high degree, and filtering of high variations in levels (part BC, DE and FG in FIG. 2) to a low degree.

In the embodiment represented in FIG. 8, the pseudo-analog signal Y is applied to a current amplifier 10, then the derivative thereof is taken by a differentiating circuit consisting of the $C_1R_1$ combination, which is then rectified by the rectifier circuit 11 of absolute value, and the output thereof is applied to the input of a blocking sampler circuit 12 which is controlled by the second derivative of the signal produced by a second differentiating circuit $R_2C_2$, rectified by a rectifier circuit 13, amplified to saturation by a saturation amplifier 14, and calibrated in time by a monostable pulse circuit 15. The output of this blocking sampler circuit 12 controls an amplifier 16 with optical-electronic feedback 17 controlling resistor $R_3$ of the network $R_3C_3$ formed of two optical-electronic couplers 18 connected in opposite fashion to charge or discharge capacitor $C_3$. The signal is then applied to a current amplifier 20, at the output of which the signal from amplifier 10, which has passed through active filter $R_3C_3$, is available in its filtered state.

This embodiment demonstrates the feasibility of the principles of the present invention, but it should be understood that other forms of processing of the filter control signal, for example by digital computer, are also within the scope of the present invention.

Likewise, the nature of the circuit serving as a variable resistor or dipole current control, can differ without thereby departing from the scope of the present invention.

Also, it is possible in other embodiments to vary the value of C in the product RC, which would obtain equivalent results.

Moreover, in order to improve the result, it is possible to filter the signal several times in sequence, taking its derivatives after each filtering step.

It should also be noted that the filtering principles herein can be applied to applications and situations other than the one specifically described above without departing from the scope of the present invention.

What is claimed is:

1. Method for the reconstitution by filtering of an analog signal, applied to restituting graphic or iconographic documents which have been digitally encoded by example for digital transmissions or storage or processing of these documents, comprising the steps of: obtaining a pseudo-analog signal by performing a double analog to digital, digital to analog conversion of the analog signal, and representing analog variations in amplitude as a function of time of this obtained signal by incremental level variations; and processing said pseudo-analog signal by filtering of the pseudo-analog signal with an active filter, and varying a time constant variable in said filtering step in accordance with the derivative with respect to time of this signal and which does not change the nature of the signal, said filtering further comprising filtering of low level variations to a high degree, and filtering of high level variations to a lesser degree.

2. Method according to claim 1, further comprising controlling the time constant of said active filter inversely with respect to the derivative of the signal to be filtered.

3. Method according to claim 1 or 2 wherein the pseudo-analog signal is transmitted to the input of the active filter, and controlling the impedance of said active filter by the absolute derivative of the positive value of the pseudo-analog signal obtained by a circuit comprising in series, an RC filter receiving the pseudo-analog signal, and a memory controlling the value of the impedance of said filter.

4. A circuit for the reconstitution by filtering of an analog signal, from a pseudo-analog signal obtained by a double analog to digital, digital to analog conversion of the analog signal, said circuit processing this pseudo-analog signal issued from this said double conversion, in which analog variations in amplitude as a function of the time are represented by incremental level variations, said processing circuit including an RC network ($R_3C_3$) with a variable impedance to which the pseudo-analog signal is transmitted as an input through an input buffer amplifier (10), and providing the reconstituted signal as an output signal through an output buffer amplifier (20), said circuit comprising:
  a. a first differentiating circuit ($R_1C_1$) connected to the output of the input buffer amplifier (10),
  b. a rectifier of absolute value (11), receiving the signal from said first differentiating circuit ($R_1C_1$),
  c. a sample and hold circuit (12) connected to the output of said rectifier (11), and the output signal of which is connected to a circuit for controlling the impedance of said RC network ($R_3C_3$),
  d. a second differentiating circuit ($R_2C_2$), connected for its input to said rectifier of absolute value (11), and for its output to a second rectifier (13),
  e. a circuit formed by a third amplifier (14), which receives a signal furnished by said second rectifier (13), and a monostable circuit (15), connected for its input to said third amplifier, and the signal from the output of said monostable circuit (15) controlling said sample and hold circuit (12).

5. Circuit according to claim 4, wherein said RC network comprises a capacitance ($C_3$) and a resistor ($R_3$) formed of two optical-electronic couplers connected in opposition to each other.

6. Circuit according to claim 4 or 5, wherein the output signal provided by said sampler circuit (12) is transmitted to optical-electronic couplers (18), forming a variable impedance for said RC network $R_3C_3$, through said circuit for controlling the impedance which comprises an amplifier (16) with optical-electronic feedback.

* * * * *